April 10, 1951     C. T. COOMBS     2,548,351
FISHING ROD HOLDER
Filed April 12, 1948

Inventor
Clarence Taswelle Coombs

By Clarence A. O'Brien
and Harvey B. Jacobson
Attorneys

Patented Apr. 10, 1951

2,548,351

UNITED STATES PATENT OFFICE 2,548,351

FISHING ROD HOLDER

Clarence Taswelle Coombs, Frederick, Okla.

Application April 12, 1948, Serial No. 20,403

2 Claims. (Cl. 248—42)

This invention relates to new and useful improvements in fishing rod holders and the primary object of the present invention is to provide a fishing rod holder so designed as to facilitate the same to be adjustably secured to the side of a boat or which may be inserted in the ground surface.

Another important object of the present invention is to provide a fishing rod holder including a rod engaging member, a boat engaging clamp, and novel and improved means for adjustably securing the rod engaging member relative to the clamp in selected angular positions.

A further object of the present invention is to provide a fishing rod holder including a rod supporting body, a pivoted arm carried by the supporting body, and novel and improved means for retaining the pivotal arm in position to the body for insertion into a ground surface, and further means for holding the pivotal arm in an inactive or inoperative position when the same is not in use.

A still further aim of the present invention is to provide a fishing rod holder that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
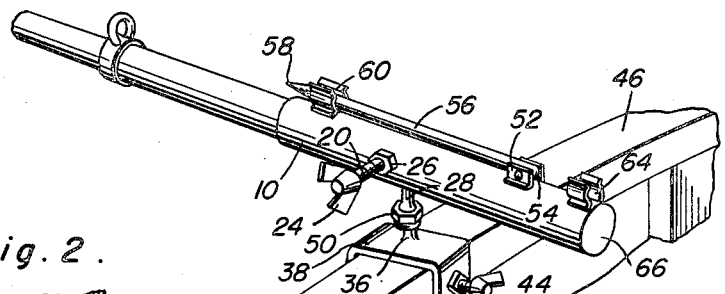
Figure 1 is a fragmentary pespective view of a boat, and showing the present invention applied thereto in use, and showing the ground engaging member in an inactive position.
Figure 2:
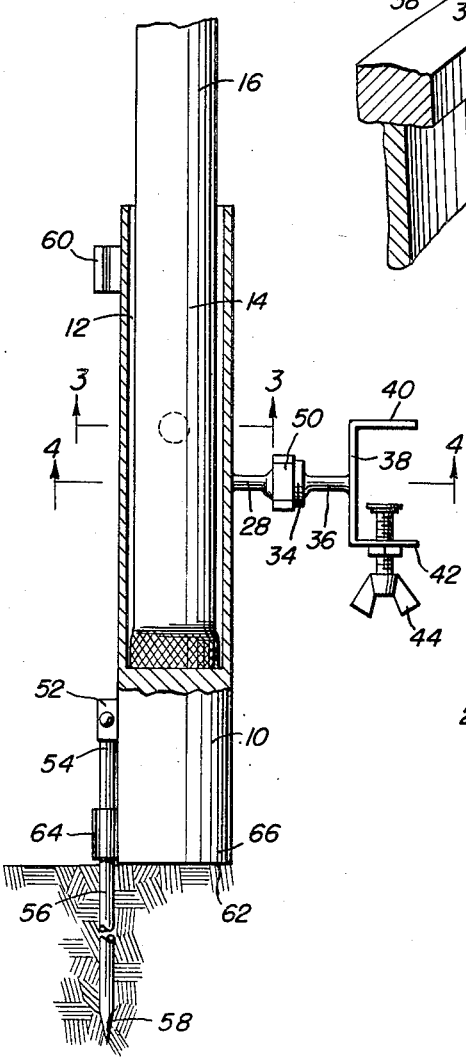
Figure 2 is a side elevational view of the present holder applied to the ground surface and supporting a portion of a fishing pole, and with parts of the present invention broken away and shown in section.
Figure 4:
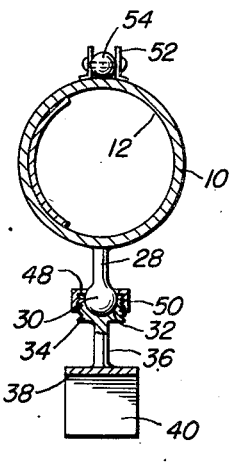
Figure 3:
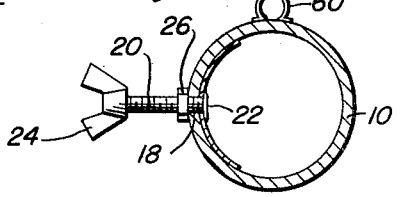
Figure 3 is a transverse horizontal sectional view taken substantially on the plane of section line 3—3 of Figure 2; and, Figure 4 is a transverse horizontal sectional view taken substantially on the plane of section line 4—4 of Figure 2.

Referring now to the drawings in detail, wherein for the purpose of illustration, there is disclosed a preferred embodiment of the present invention, the numeral 10 represents a substantially cylindrical body having a socket 12 at one end that engages one end portion 14 of a fishing pole or other such pole 16.

Receivably engaging an internally threaded aperture 18 provided in the body 10, is a set screw 20 having an arcuate bearing plate 22 that includes a wing-type head portion 24. A lock nut 26 adjustably mounted on the set screw retains the same in a selected adjusted position with the bearing plate 22 engaging the end portion 14 of the fishing pole 16.

Fixed to one side of the body 10, is an outwardly projecting lug 28 the outer extremity of which is provided with a spherical element 30 that frictionally engages for universal movement, a ball recess or concaved seat 32 formed in the enlarged externally threaded end portion 34 of a support arm 36 which is rigidly secured by welding or the like to the web portion 38 of a substantially U-shaped or channel-shaped bracket 40. One leg portion 42 of the bracket 40 adjustably supports a clamping screw 44 which is employed for removably securing the present invention in position to the side or gunwale 46 of a boat.

Slidably positioned on the lug 28 is an apertured plate 48 that frictionally engages the spherical element 30. Integrally formed with the plate 48 is an annular, internally threaded flange 50 that receivably engages the threaded end portion 34 to retain the body 10 disposed at a selected angle relative to the bracket 40.

Fixed to the body 10 is a pair of support ears 52 between which there is pivoted one end 54 of a pivotal arm 56 having a ground engaging tip or pointed extremity 58 that is held in an inactive position by a forward pair of resilient clips 60 when the present holder is applied to the side of a boat as illustrated in Figure 1.

When the present holder is used in position relative to the ground surface 62, the pivotal arm 56 is pivoted rearwardly or outwardly so that the same will frictionally engage a rear pair of resilient clips 64 fixed on the outer periphery of the body 10 with the pointed end 58 thereof projecting outwardly from the closed end 66 of the body 10 to extend into the ground surface.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed as new is:

1. A fishing rod holder comprising an elongated cylindrical member having a socket in one end for receiving one end of a fishing pole, said member having a transverse internally threaded opening in the socketed end thereof, an adjusting screw receivably engaging the threaded opening in said member, a concavo-convexed pressure plate secured to said adjusting screw and received in said socket for retaining one end of a fishing pole positioned in said socket, a lug fixed to and projecting laterally from said member, a spherical element fixed to said lug, a C-clamp having a laterally projecting arm secured thereto, said arm having an enlarged externally threaded end portion, a concaved recess provided in the enlarged end portion of said arm receiving said spherical element, a retaining plate having an aperture receiving a portion of said spherical element, and an internally threaded flange fixed to said retaining plate and threaded on the enlarged end portion of said arm to retain the member disposed at a selected angle relative to said C-clamp.

2. A fishing rod holder comprising an elongated cylindrical member having a socket in one end for receiving one end of a fishing pole, means carried by the socketed end of said member for clamping one end of a fishing pole within the socketed end of said member, a lug fixed to and projecting laterally from said member, a spherical element fixed to said lug, a C-clamp having a laterally projecting arm secured thereto, said arm including an enlarged externally threaded end portion having a concave recess receiving said spherical element, a retaining plate having a central aperture receiving a portion of said spherical element, and a continuous internally threaded flange fixed to said plate and threaded on the enlarged end portion of said arm to retain the member disposed at a selected angle relative to said C-clamp.

CLARENCE TASWELLE COOMBS.

REFERENCES CITED

The following references are of record in the file of this patent:

UNITED STATES PATENTS

| Number | Name | Date |
|---|---|---|
| 374,737 | Geils | Dec. 13, 1887 |
| 612,048 | Miller et al. | Oct. 11, 1898 |
| 1,096,999 | Burtchett | May 19, 1914 |
| 1,352,663 | Hafner | Sept. 14, 1920 |
| 1,523,223 | Leonardos | Jan. 13, 1925 |
| 1,534,642 | Hoagland | Apr. 21, 1925 |
| 1,789,509 | Bergstrom | Jan. 20, 1931 |
| 2,452,279 | Young | Oct. 26, 1948 |
| 2,455,037 | Bremer | Nov. 30, 1948 |

FOREIGN PATENTS

| Number | Country | Date |
|---|---|---|
| 13,052 | Great Britain | of 1884 |
| 13,150 | Great Britain | of 1897 |